United States Patent [19]
Erceg

[11] Patent Number: 4,646,468
[45] Date of Patent: Mar. 3, 1987

[54] ARBOR CONSTRUCTION

[76] Inventor: Douglas A. Erceg, 10011 NW. St. Helens Rd., Portland, Oreg. 97231

[21] Appl. No.: 710,298

[22] Filed: Mar. 11, 1985

[51] Int. Cl.⁴ .......................................... A01G 17/06
[52] U.S. Cl. ...................................................... 47/44
[58] Field of Search .................... 47/44, 45, 46, 47; D25/71; 135/118; 52/93, 92, 90, 79.5; 403/217, 219, 403

[56] References Cited

U.S. PATENT DOCUMENTS

| D. 6,962 | 10/1873 | Grump | D25/71 |
| D. 66,533 | 2/1925 | George | D25/71 |
| D. 66,679 | 2/1925 | George | D25/71 |
| 129,805 | 7/1872 | Forman | 52/93 |
| 1,083,404 | 1/1914 | Kenyon | 52/93 |
| 3,174,255 | 3/1965 | Knell | 47/47 |
| 3,474,802 | 10/1969 | Loring | 135/118 |

FOREIGN PATENT DOCUMENTS

| 122589 | 2/1878 | France | 47/46 |
| 1379991 | 10/1964 | France | 52/92 |

*Primary Examiner*—James R. Feyrer
*Assistant Examiner*—Bradley M. Lewis
*Attorney, Agent, or Firm*—Eugene M. Eckelman

[57] ABSTRACT

Two roof sections are arranged for seated engagement on a pair of upright legs. Each of these four sections is of flat construction for compact shipment and storage. The legs have an adjusting support joint connection with the rafters of the roof sections to allow for different widths of the arbor as it is being constructed. Gusset plates are attachable to the roof and leg sections for connecting these parts. Ground anchor stakes are provided for bolted connection to the leg sections in both a use position and an inverted non-use position.

2 Claims, 3 Drawing Figures

U.S. Patent  Mar. 3, 1987  4,646,468
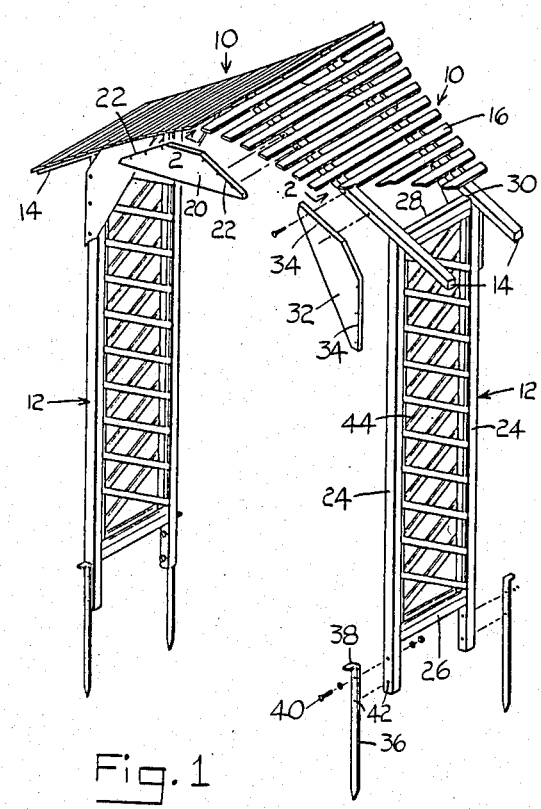
Fig. 1
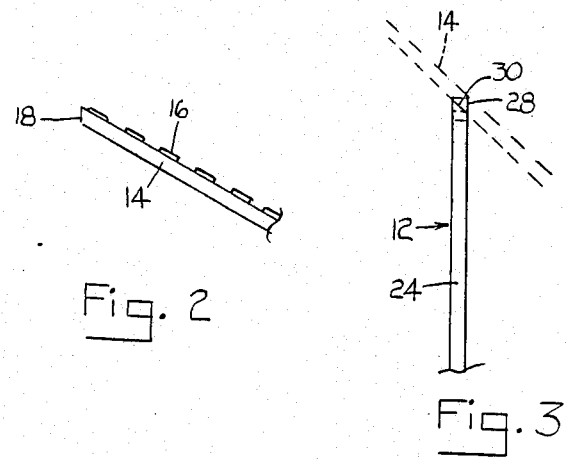
Fig. 2
Fig. 3

ARBOR CONSTRUCTION

BACKGROUND OF THE INVENTION

This invention relates to new and useful improvements in arbor constructions of the type utilized for supporting climbing roses, ivy, etc.

The present arbor construction was designed to overcome certain deficiencies of prior arbor constructions. More particularly, prior arbors or trellises have not had a combination of structural features that allow them to be relatively inexpensive to manufacture by mass production methods, to easily package and ship, and in general to provide a product capable of meeting satisfactory marketing characteristics. Another inherent disadvantage is that the width relationship of sides of prior arbors have not been readily adjustable in order that one kit construction can accommodate various desired widths.

SUMMARY OF THE INVENTION

According to objectives of the present invention, an arbor construction is provided which overcomes deficiencies in prior arbors, namely, it is relatively inexpensive to manufacture and can be manufactured by mass production methods, it can be constructed in kit form and readily shipped and stored in a flat bundled condition, it has means facilitating ready adjustment in its construction to variable widths, and it employs novel ground anchor means which facilitate a firm attachment to the ground. The ground anchor means also have a structural combination with leg portions of the arbor so as to maintain a flat bundled condition in shipment and storage.

In carrying out these objectives, a roof portion is provided having two sections, each section having a pair of rafters extending from a mid point outwardly to lateral ends and also having cover means on the rafters. A pair of side legs support the roof sections to form the arbor construction and each leg comprises a pair of upright frame members supporting latticework therein. The upright frame members of the legs have horizontal upper and lower connecting frame pieces, the upper ends of the upright frame members comprising a supporting surface for the rafters and the upper horizontal connecting frame pieces projecting above the ends of the upper ends of the upright frame members whereby to form an abutting, positioning joint for the rafters. The legs are arranged to be positioned at any desired location along the rafters to vary the width of the arbor. Since the roof portion is constructed of two sections comprising independent pairs of rafters and cover means, such sections can either be secured together at the midpoint to form a self supporting arbor with a two legged support or one roof section and one leg can form a lean-to arrangement for engagement with the side of a building. The ground anchor means comprise stakes which project below the legs in use position but which can be reversed and attached to the side legs in a non-use position for compactness in shipment and storage.

The invention will be better understood and additional objects will become apparent from the following description taken in connection with the accompanying drawings.

BRIEF DESCRIPTION OF THE DRAWINGS

FIG. 1 is a perspective view of the present arbor, a portion of the structure being broken away and also portions thereof being shown in exploded relationship;

FIG. 2 is a fragmentary elevational view taken on the line 2—2 of FIG. 1; and

FIG. 3 is a fragmentary elevational view of an upper portion of a side leg and showing in broken lines the joint that it forms with a rafter.

DETAILED DESCRIPTION OF A PREFERRED EMBODIMENT

With particular reference to the drawings, the present arbor comprises basically four main parts each constructed independently and being flat for convenience in packaging and storing. These parts comprise two independent roof sections 10 and two independent legs 12. The roof sections 10 each comprises a pair of rafters 14 secured in parallel relation by a top covering 16 such as a plurality of slats. The edge contour of the covering 16 may take various designs such as for example the curved oriental design shown. The inner or upper ends 18 of the rafters 14, FIG. 2, are angled for abutment with the opposite rafter. Securement of the opposing rafters at the joint is by centrally located gusset plate 20 having oppositely angled top edges 22 corresponding to the pitch of the roof sections. This plate is fastened, such as by screws, to the rafters to provide a rigid roof peak structure.

Each of the legs 12 comprises a pair of upright frame members 24 having one or more lower horizontal connecting frame pieces 26 and one or more upper horizontal connecting frame pieces 28. With particular reference to FIGS. 1 and 3, the upper end 30 of the upright frame members 24 is angled similar to the pitch of the rafters 14, and the rafters seat on these ends for support of the roof on the legs. As best apparent in FIG. 3, the upper connecting frame pieces 28 are of a vertical cross section dimension such that they project below and above the angled end 30 whereby the rafters when seated on the upper ends 30 abut against the ends of these frame pieces for fitted engagement of the roof on the legs. The rafters 14 are constructed of lumber pieces having a cross width dimension the same as that of the frame members 24 to provide a flush face surface at the joint.

With the present joint arrangement between the roof and the legs, the legs can be adjusted to various positions along the rafters to vary the width of the arbor. Securement of the legs in the desired position at the roof is accomplished by corner gusset plates 32 having angled edges 34 corresponding in their angular relationship so as to extend along the line of the rafters and the frame members 24. These members are secured in place by suitable fasteners, such as screws.

The legs are associated with ground anchor means comprising rigid stakes 36 having a top angled end 38 which serves as a pounding surface. Securement of the legs to the stakes is accomplished by bolts 40 extending through suitable holes 42 in the stakes and in the upright frame members 24. In use, the stakes are bolted in position as shown in FIG. 1 to provide secured anchoring of the arbor in the ground. In non-use position, such as for shipment and storage, the stakes are also attached to the members 24 by the bolts but instead are inverted, namely, the angled end 38 is disposed downwardly and positioned across the bottom of the members 24 with the shank thereof extending up the outer side of the leg. For this purpose, the holes 42 in the stakes and legs are selectively located for bolted connection of the stakes in both of their use and non-use positions.

Legs 12 may have any suitable latticework 44 secured therein in a well known manner.

As stated above, the four main pieces 10 and 12 are constructed independently of each other and are each flat for easy packaging and shipment. With the stakes 36 bolted to the legs in their inverted position for shipment, they cannot become misplaced or lost and also contribute to the flat packaging feature.

After suitable site location of the arbor has been determined, the desired width is also determined and the leg sections anchored to the ground by the stakes 36, the latter first being removed from their non-use position and inverted. The roof sections are secured together by the gusset plates 20 with the angled edges 18 in abutting relation with each other, and the rigid roof assembly is then placed in supported position on the top leg surfaces 30 and secured in position by the gusset plates 32. The width positioning of the legs will lower or raise the height of the roof slightly but this does not interfere with the use of the completed arbor. With the use of screws for fastening the gusset plates 20 and 32 in place, the arbor can be readily taken down if desired.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An arbor construction comprising
    a roof having a pair of roof portions including rafters extending from a peaked mid point outwardly to lateral ends and also having cover means on said rafters,
    a pair of side legs supporting the roof portions in an arbor construction through which a person can walk in the direction at which the peak extends,
    each of said side legs comprising a pair of upright frame members having upper and lower ends and supporting lattice-work therebetween,
    horizontal connecting frame pieces secured at their ends to said pair of upright frame members adjacent the upper and lower ends of said lattice-work,
    the upper ends of said upright frame members comprising an angled supporting surface for said rafters and said upper horizontal connecting frame pieces having a projecting portion extending above the ends of said upper angled ends of said upright frame members and a portion of the ends thereof in abutment with said upright frame members and said rafters whereby to form a lateral support joint for said rafters by said upright frame members and said connecting frame pieces,
    said pair of roof portions and said pair of side legs being individually constructed in a flat-type configuration for compact shipment and storage,
    gusset plate means secured to said rafters at said peak for connecting said roof portions together and gusset plate means secured to the rafters and said side legs for connecting said side legs to said rafters in an assembled arbor with said roof portions being in peaked relation and said legs supporting said rafters,
    said side legs being positionable along said rafters to selectively locate said joints and vary the width of said arbor,
    and ground anchor means on the lower ends of said upright frame members.

2. The arbor construction of claim 1 wherein said ground anchor means comprise stakes removably attachable to the lower end of said upright frame members, said stakes having a right angle bend disposed upwardly in use position for serving as a pounding surface and disposed downwardly and across the bottom ends of respective upright frame members for storage and shipment, said stakes being attachable in both its use and storage positions by bolts and bolt receiving holes arranged to fasten said stakes to said frame members in both positions.

* * * * *